Patented Dec. 18, 1945

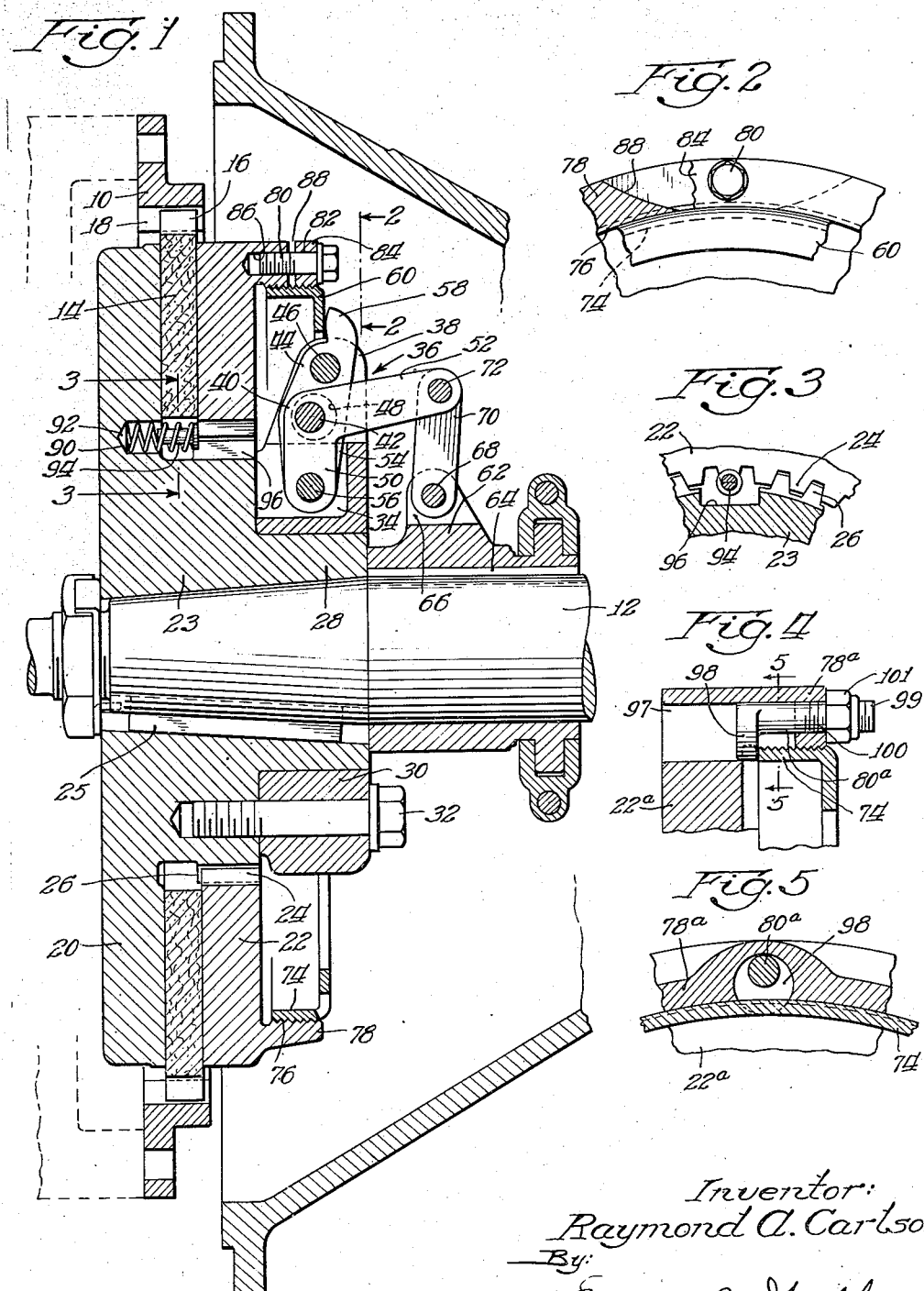

2,391,124

UNITED STATES PATENT OFFICE 2,391,124

CLUTCH

Raymond A. Carlson, Rockford, Ill., assignor to Borg-Warner Corporation, Chicago, Ill., a corporation of Illinois Application March 8, 1943, Serial No. 478,331

6 Claims. (Cl. 192—68)

This invention relates to friction clutches of the positively engaging type, i. e., in which clutch engaging pressure is transmitted, through lever mechanism, from an external operator member, and has as one of its objects to provide a compact arrangement of lever mechanism capable of producing a relatively high pressure multiplication.

Another object of the invention is to provide a clutch wherein a compact, high multiplication ratio lever mechanism is combined with an over-center toggle link mechanism for transmitting the pressure from the operator member.

Another object of the invention is to provide an improved means for adjusting the lever mechanism to compensate for facing wear. A further object of the invention is to provide improved and simplified means for moving the pressure plate away from its engaged position when the lever mechanism is moved to clutch disengaged position.

My invention consists of the novel constructions, arrangements and devices to be hereinafter described and claimed for carrying out the above-stated objects and such other objects as will appear from the following description of a certain preferred embodiment illustrated in the accompanying drawing wherein:

Fig. 1 is an axial sectional view of an industrial type clutch embodying the invention;

Fig. 2 is a detailed view of the adjustment lock;

Fig. 3 is a detailed view of the pressure plate retracting means;

Fig. 4 is an axial sectional view of a modified form of the locking mechanism; and Fig. 5 is a transverse sectional view of the same.

As an example of one form in which the invention may be embodied, I have shown in the drawing an industrial type clutch including a driving member in the form of a ring 10 adapted to be bolted to the flywheel of an engine, a driven shaft 12, a friction ring or facing member 14 having external teeth 16 meshing with internal teeth 18 in the driving ring 10, and a pair of annular clamping members 20 and 22 respectively adapted to engage the friction ring 14 between them so as to establish a driving connection between the driving and driven members. The clamping member 20 has a hub portion 23 keyed as at 25 to the driven shaft 12, and the clamping member 22, which properly responds to the term "pressure plate" is provided with internal teeth 24 meshing with external teeth 26 on the hub member 24. The teeth 24, 26 provide a driving connection between the clamping members which permits the pressure plate 22 to shift axially for engaging and releasing the clutch.

The hub 23 has a reduced sleeve portion 28. A lever fulcrum ring 30 is piloted on the sleeve portion 28 and secured to the hub 23 by machine screws 32 extending through the ring 30 and threaded into the hub 23.

The fulcrum ring 30 is provided with a series of recesses 34 each receiving the inner ends of a set of levers indicated generally at 36. Pairs of ears 38, formed integrally with the fulcrum ring 30, project radially outwardly to define spaces forming continuations of the recesses 34. Each set of levers 36 comprises a pair of primary levers 40 embraced between the ears 38 and pivoted on a pin 42 mounted in the ears, and a single secondary lever 44 embraced between the pair of levers 40 and pivoted on a pin 46 mounted in the ears 38. The pin 42 extends through a hole 48 in the lever 44 which provides sufficient clearance to permit the lever 44 to oscillate the required amount. The primary levers 40 are in the form of bell crank levers having arms 50 projecting inwardly from the pivot 42 and embracing the inner arm 54 of the lever 44, and an arm 52 projecting rearwardly from between the levers 44 and ears 38 in a direction substantially parallel to the driven shaft 12. The pivot pin 46 is located radially outwardly of the arm 52, with sufficient clearance to permit the latter to oscillate radially the required amount. This arrangement disposes the pivot pin 46 near the outer end of the lever 44, thus subdividing the lever 44 into the relatively long inner arm 54 which is pivoted at 56 to the inner end of the primary lever arm 50, and a relatively short outer arm 58 which is adapted to engage an adjustment ring 60 attached to the pressure plate 22.

An operator sleeve 62 is slidably keyed to the driven shaft 12 as at 64, and has a plurality of pairs of spaced ears 66. Between each pair of ears 66 is pivoted, at 68, the inner end of a toggle link 70 the outer end of which is pivoted at 72 to the rear ends of the primary lever arms 52.

The arms 52 of the primary levers 44 are somewhat longer than the arms 50, so as to give a certain amount of pressure multiplication. The ratio between the lever arms 54 and 58 provides a greatly augmented pressure multiplication, thus producing a relatively high total multiplication ratio. At the same time, the lever arrangement is very compact owing to the fact that the arms 50 of the primary levers 40 embrace the inner arm 54 of the secondary lever. Thus an annular space of relatively narrow axial dimension accommodates the entire lever mechanism with the exception of the arms 52 which necessarily project rearwardly for connection with the toggle linkage.

The bearing ring 60 has an axial flange 74 which is externally threaded at 76 into a flange 78 projecting rearwardly from the pressure plate 22. The bearing ring 60 is normally locked against rotation by a locking screw 80 extending loosely through an aperture 82 in a separated portion 84 of the flange 78 and threaded into a threaded hole 86 in the body of the flange 78. The flange portion 84 is separated axially from the body portion of the flange 78 by a slot 88 projecting radially through the flange. The portion 84 is joined at its ends or circumferential extremities to the body of the flange 78. Tightening of the screw 80 flexes the separated portion 84 axially toward the adjacent body of the flange 78 so as to clamp the threads 76 securely between these adjacent flange portions. By loosening the screw 80, the bearing ring 60 is freed for rotation to adjust the lever mechanism to compensate for facing wear.

Movement of the operator sleeve 62 to the left as viewed in Fig. 1 causes the toggle links 70 to approach and slightly pass through radial or "on center" positions and thus to move the primary lever arms 52 outwardly, the lever arms 50 and 54 to the right and the outer lever arm 58 to the left, resulting in the pressure plate 22 being moved into engagement with the friction ring 14, and the latter into engagement with the clamping member 20. This movement compresses a plurality of retractor springs 90 which are mounted in bores 92 in the clamping member 20 and exert pressure against the teeth 24 of the pressure plate through the medium of headed studs 94 piloted in the springs 90. Opposite each bore 92, a tooth 26 of the hub 24 is removed to provide a space 96 adapted to receive the tool by which the bore 92 is formed and, in the assembled clutch, to receive the stud 94 and the spring 90.

In Figs. 4 and 5 I have disclosed a modified form of the locking mechanism, wherein the pressure plate 22a is provided with a cylindrical bore 97 extending axially into the flange 78a, and wherein the locking element is in the form of a bolt 80a having at one end an eccentric head 98 fitted in the bore 97 and engaging the inner extremity of the flange 74 of the adjusting ring 60. The other end of the bolt 80a is threaded as at 99 and slidably extended through an opening 100 in the flange 78a, the opening 100 communicating with and being eccentrically disposed with reference to the axis of the bore 97. A nut 101 is threaded on the bolt 80a and engages the end face of the flange 78a whereby tightening of the nut serves to draw the head 98 into clamping engagement with the flange 74.

It is to be understood that the foregoing description is merely illustrative of the preferred embodiment of the invention and that the scope of the invention, therefore, is not to be limited thereto but is to be determined by the appended claims.

I claim:

1. In a friction clutch, an axially fixed clutch member, an axially movable clutch member, an axially movable operator member, a toggle link pivoted to said operator member and extending in a generally radially outward direction, a bell crank lever fulcrumed on said fixed member, having an arm extending in a generally axial direction and pivoted to the outer end of said toggle link, an arm extending radially inwardly from its fulcrum, and a lever fulcrumed on said fixed member on an axis located radially outwardly of said bell crank lever, having an arm extending generally substantially radially inwardly and pivoted at its inner end to said radial arm of the bell crank lever, and having an arm extending outwardly and adapted to transmit clutch engaging pressure to said movable clutch member.

2. A friction clutch as defined in claim 1, wherein said last mentioned lever has an aperture and said bell crank lever is fulcrumed on a pivot pin extending through said aperture with sufficient clearance to permit said last mentioned lever to oscillate the required amount.

3. A friction clutch as defined in claim 1, wherein said toggle link is adapted to move overcenter in the clutch engaged position so as to maintain said operator member in clutch engaging position.

4. A friction clutch as defined in claim 1, wherein said toggle link is adapted to move overcenter in the clutch engaged position so as to maintain said operator member in clutch engaging position, said operator member being adapted to be stopped in said clutch engaging position by contact with said fixed clutch member.

5. A friction clutch as defined in claim 1, including an annular adjustment member carried by said movable clutch member and axially adjustable relative thereto, the outer arm of last mentioned lever engaging said adjustment member.

6. A friction clutch comprising a fixed clutch member, a pressure plate axially movable with reference to said fixed clutch member, an axially movable operator member, a toggle link extending generally radially outwardly from said operator member and pivoted thereto at its inner end, a bell crank lever pivoted on said fixed clutch member, having an arm extending rearwardly and pivoted to the outer end of said toggle link and having an arm extending generally radially inwardly, and a secondary lever pivoted on said fixed clutch member radially outwardly of said bell crank lever pivot, having a relatively long arm extending radially inwardly and pivoted to the inner end of said radial bell crank arm and having a relatively short arm extending radially outwardly and adapted to transmit clutch engaging pressure to said pressure plate.

RAYMOND A. CARLSON.